(12) United States Patent
Balasaygun et al.

(10) Patent No.: US 8,306,191 B2
(45) Date of Patent: Nov. 6, 2012

(54) CALLER RECOGNITION BY VOICE MESSAGING SYSTEM

(75) Inventors: Mehmet C. Balasaygun, Freehold, NJ (US); Michael J. Killian, Toms River, NJ (US)

(73) Assignee: Avaya Inc., Basking Ridge, NJ (US)

( * ) Notice: Subject to any disclaimer, the term of this patent is extended or adjusted under 35 U.S.C. 154(b) by 294 days.

(21) Appl. No.: 12/483,674

(22) Filed: Jun. 12, 2009

(65) Prior Publication Data

US 2010/0316198 A1    Dec. 16, 2010

(51) Int. Cl.
 *H04M 1/64* (2006.01)
(52) U.S. Cl. .................................. 379/88.02; 379/88.19
(58) Field of Classification Search ............... 379/88.02, 379/88.01, 201.01
 See application file for complete search history.

(56) References Cited

U.S. PATENT DOCUMENTS

| | | | |
|---|---|---|---|
| 4,837,804 A | 6/1989 | Akita | |
| 5,247,497 A | 9/1993 | Cohn | |
| 5,291,302 A | 3/1994 | Gordon et al. | |
| 5,897,616 A | 4/1999 | Kanevsky et al. | |
| 5,999,611 A | 12/1999 | Tatchell et al. | |
| 6,266,399 B1 | 7/2001 | Weller et al. | |
| 6,363,411 B1 | 3/2002 | Dugan et al. | |
| 6,397,059 B1 | 5/2002 | Vance et al. | |
| 6,445,775 B1 * | 9/2002 | Morganstein et al. | 379/88.02 |
| 6,779,030 B1 | 8/2004 | Dugan et al. | |
| 6,895,558 B1 | 5/2005 | Loveland | |
| 7,054,819 B1 | 5/2006 | Loveland | |
| 2003/0220784 A1 * | 11/2003 | Fellenstein et al. | 704/201 |
| 2008/0215323 A1 * | 9/2008 | Shaffer et al. | 704/246 |

FOREIGN PATENT DOCUMENTS

EP    1507394    2/2005

OTHER PUBLICATIONS

Extended European Search Report for Patent Application No. 10158287.2, dated Aug. 24, 2010.

* cited by examiner

*Primary Examiner* — Curtis Kuntz
*Assistant Examiner* — Amal Zenati
(74) *Attorney, Agent, or Firm* — Sheridan Ross P.C.

(57) ABSTRACT

Voice analysis of a subscribers' greeting is used to assist with determining a true identity of a caller. When a greeting is recorded by the subscriber (e.g., the subscriber speaks their voice as part of their default greeting, or a custom greeting for a voice mail system), the system can analyze the greeting and create a voice signature or voiceprint of the greeting. This voiceprint information can be saved in the system and associated with the subscriber. When a subscriber changes their greeting that was previously analyzed to create a voiceprint, the messaging system can optionally analyze the newly recorded greeting to create a new voiceprint for the subscriber, with the system saving the new voiceprint in the system for future recognition tasks. This voiceprint is then used to identify the true identity of a caller that leaves a voice message.

20 Claims, 3 Drawing Sheets

CALLER RECOGNITION BY VOICE MESSAGING SYSTEM

FIELD OF THE INVENTION

One exemplary aspect of the present invention is directed toward communications, and more specifically toward providing enhanced caller ID information. Even more particularly, one exemplary aspect is directed toward providing caller ID information based on a voice analysis and comparison to voice prints in an enterprise voicemail system.

BACKGROUND OF THE INVENTION

Caller-ID, also known as caller-identification (CID), or alternatively calling number identification (CNID), is a public telephone service provided over the plain old telephone service (POTS) lines that transmits a caller's number to the caller party's telephone equipment during the ringing signal, or when the call is being set up before the call is answered. Caller ID can optionally provide a name, either personal or company, with the calling telephone number, with the caller-ID information optionally being shown on the display of the called party's telephone. Caller ID on call waiting (CIDCW) operates in a similar manner with caller ID on call waiting displaying the number and optionally the name of an incoming caller when the called party is already on the phone.

Voicemail is a centralized system of managing telephone messages, typically for a large group of people, such as for a company in an enterprise environment. Operation of the system includes the playing of a greeting when a called party is not available, with the ability for the calling party to leave a message for the called party after the greeting has completed.

Any message left by the calling party can then be retrieved by the called party and played back at a later point in time. Additional functions for the called party include the ability to save a left message, forward a left message, respond to the message, callback the calling party, and the like.

SUMMARY OF THE INVENTION

Most of the current voice messaging systems provide caller ID information with a left message based on the signaling information received from the network, such as the PSTN. The information may be received over any type of signaling the voice messaging system is connected with. For example, the call may arrive at the voice messaging system from a PSTN network or IP network (H.323, QSIG, SIP, or in general any analog or digital network). While the information about the caller ID is important, depending on the circumstances, it may sometimes provide information that is not as relevant to the voicemail subscriber. For example, it may be more important for a subscriber to know that a voice message from an outside line is not a telemarketer, but the subscriber's colleague calling from a hotel or other external line. Similarly, the caller ID information of a voice message left from a phone in a conference room is not as interesting as the identity of the person that actually left the voice message.

One exemplary aspect of the invention addresses a mechanism by which a voice messaging system can be enhanced with an intelligent algorithm and process that attempts to recognize and more accurately identify the calling party to the voicemail system user.

In accordance with one exemplary embodiment, communications are enhanced by enabling a messaging system with a voice recognition algorithm to provide additional information about the caller of a voice message.

A productivity problem exists with current voice messaging systems. In certain circumstances, the caller ID information stored with a voice message does not reveal the true identity of the caller—including callers that are all subscribers to the enterprise PBX and voicemail systems. The voicemail system subscriber may not get a response to messages that would have otherwise been treated with a higher priority had the caller been properly identified. Examples where the basic caller ID of the present day messaging system falls short are:

1. A call made from a conference room. For a voicemail subscriber looking through (e.g., visual voicemail) or listening to (e.g., TUI interface) the message headers will see the conference room number in the caller ID field. The identity of the person that made the call is not shown. In addition, despite the voicemail being left from an "internal" extension, the receiver cannot "reply" to the true caller since they did not call from their phone extension.

2. Identity of a colleague A leaving a voice message for subscriber C from colleague B's office phone is not revealed. The voice message header shows the message to have come from colleague B, instead of colleague A. For example, a supervisor leaving a message from a peer's office may be more important to the subscriber than a voice message from the peer. However, without a real identification of the caller, it is generally not possible for the subscriber to know who the caller is, or to easily "reply" to the caller's mailbox without actually listening to the message.

3. An external call with an unknown caller ID can be mistaken or viewed as an unimportant call by a subscriber who does not know the message is associated with a call from, for example, their supervisor staying at a hotel with an out-of-area telephone number or a business supplier. The user does not realize, until actually listening to the message that it is from a colleague or supervisor. In addition, the user can not easily leave a reply to the message in the caller's mailbox.

Accordingly, one exemplary embodiment provides an identification of the person who actually left a voice message with the messaging system. The exemplary solution is based on voice recognition analysis of the caller based on a comparison of the caller's voice against the voiceprints already known to the messaging system. Numerous known techniques for performing voiceprint analysis can be used with the systems and methods of this invention to assist with the determination of the identity of the calling party.

For example, and in accordance with one exemplary embodiment, manual intervention by a mailbox owner is not required for identification. Voice analysis of the subscribers' greeting can be used. When a greeting is recorded by the subscriber (e.g., the subscriber speaks their voice as part of their default greeting, or a custom greeting for the voice mail system), the system can analyze the greeting and create a voice signature or voiceprint of the greeting. This voiceprint information can be saved in the system and associated with the subscriber. To help conserve space, the messaging system may only store one voiceprint per subscriber. However, the system could also be scaled to associate many voiceprints with a particular subscriber. When a subscriber changes their greeting that was previously analyzed to create a voiceprint, the messaging system can optionally analyze the newly recorded greeting to create a new voiceprint for the subscriber, with the system saving the new voiceprint in the system for future recognition tasks.

In accordance with an exemplary embodiment, a process by which the system can try to identify the caller can be based on a number of steps. In order to reduce the number of comparisons done by the system, if caller ID information is available for the call arriving at the messaging system for subscriber A, and the caller ID matches another subscriber's ID (e.g., subscriber B) in the messaging system, the voiceprint analysis is started by first comparing the voiceprint of the message against subscriber B's voiceprint. If the match is not found, the comparison will need to be expanded against other voiceprints in the system. The search algorithm can be designed to look at several factors, such as time of day, organizational chart associated with subscriber A's or B's organization, identity of people in the subscribers contact information, and other factors such as recent messages that were analyzed and identified in subscriber A's voice mailbox (i.e., when the same person leaves repeated voice messages).

Based on the bandwidth constraints of the existing networks (e.g., voice filtered around a limited range of frequencies in the PSTN networks), it is possible that the quality of a voice message left by someone calling from an external phone may degrade significantly, and the voiceprint comparison may come with an ID match that is not very reliable. In such a case, the system could optionally use a confidence threshold level to decide whether a particular voiceprint match can be considered as accurate or not. If an analysis comes below a threshold assigned to a subscriber, the match is not considered accurate, and the comparison continues until a decision is made to stop. It should be noted that all subscribers could be pre-provisioned with a default threshold level. The threshold level is something that can be adjusted by a subscriber over time. For example, if a subscriber sees incorrect identification of the messages as a result of voice recognition, the subscriber may choose to increase the threshold to reduce the likelihood of incorrect matches.

When a voiceprint match is found, and the caller ID information from the analysis is different from the caller ID information received from the network via signaling, the "recognized caller ID" is saved with the message. This would usually be, but isn't limited to, the internal voice mail/PBX extension associated with the caller. This recognized caller ID information can be used to handle the message routing options properly, such as for correct routing of messages that the subscriber decides to reply-to and forward-to in the system. Additional message alerting and prioritization rules can be created for the message, which take advantage of the "recognized caller ID" information. For example, if a voice message left from an external phone number is identified as a message from the subscriber's supervisor, it is also possible to automatically increase the priority of the message and alert differently to the user. An example as to when this may be useful is as follows: a supervisor may be calling from a customer's site, using a customer's phone. In this case, the caller ID signaled by the network comes up as the external number unknown to the subscriber. However, the "recognized caller ID," based on the analysis done by the messaging system, indicates the supervisor as the person who left the message. It is possible that the supervisor is trying to reach the subscriber to get their help during talks with the customer. In this case, the messaging system identifies the supervisor as the caller, and recognizes that the supervisor is calling from an external/unknown number, and increases the priority of the message. These and similar types of prioritization rules could be administered as a general policy by using an interface to the messaging system, or by subscribers themselves.

Additionally, the systems, techniques and protocols disclosed herein can be extended to work for voice-plus-video multi-media messaging systems. The concept of the voiceprint can be extended to the concept of "ID print" which is a combination of the voiceprint along with a face recognition "print" created by a multi-media messaging system, or based on the analysis of the face by itself. As explained, the system can be trained by the mailbox subscriber during the creation of the ID prints (e.g., greetings), so that they can later be used during message comparisons. In general an identification print can be based on any recognizable aspect of a subscriber that can then be used to assist with determining a true identity.

In accordance with another exemplary embodiment, a system discovers the "true ID" of the caller, with this true caller ID capable of being used by the system for items such as routing, prioritizing, and alerting regarding the presence of a message at a subscribers visual voicemail or TUI interface.

Accordingly, aspects of the invention relate to caller ID information.

More specifically, certain aspects of the invention relate to trying to determine a true identity of a caller.

Even further aspects of the invention relate to replacing or supplementing network-provided caller ID information with information derived from a voiceprint or ID print analysis.

Even further aspects of the invention relate to providing extended telephony functionality based on a caller's determined identity.

Even further aspects of the invention relate to managing one or more thresholds associated with determining an identity of a caller.

Even further aspects of the invention relate to determining an identity of a contact or based on one or more of a comparison of their voice or face to stored samples.

Additional aspects of the invention relate to utilizing greetings in an enterprise-based voice messaging system as voiceprint samples.

Still further aspects of the invention relate to utilizing supplemental or substitute caller ID information for call handling.

Even further aspects of the invention relate to updating or replacing caller ID information in a subscriber's visual voicemail or TUI interface based on a determined identity of a caller.

The present invention can provide a number of advantages depending on the particular configuration. These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like.

While circuit or packet-switched types of communications can be used with the present invention, the concepts and techniques disclosed herein are applicable to other protocols.

Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be described below in relation to a communications environment. Although well suited for use with circuit-switched or packet-switched networks, the invention is not limited to use with any particular type of communications system or configuration of system elements and those skilled in the art will recognize that the disclosed techniques may be used in any application in which it is desirable to provide enhanced Caller id recognition. For example, the systems and methods disclosed herein will also work well with SIP-based communications systems and endpoints. Moreover, the various endpoints described herein can be any communications device such as a telephone, speakerphone, cellular phone, SIP-enabled endpoint, softphone, PDA, conference system, video conference system, wired or wireless communication device, or in general any communications device that is capable of sending and/or receiving voice and/or data communications.

The exemplary systems and methods of this invention will also be described in relation to software, modules, and associated hardware and network(s). In order to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated however, that the present invention may be practiced in a variety of ways beyond the specific details set forth herein.

Figure 1:
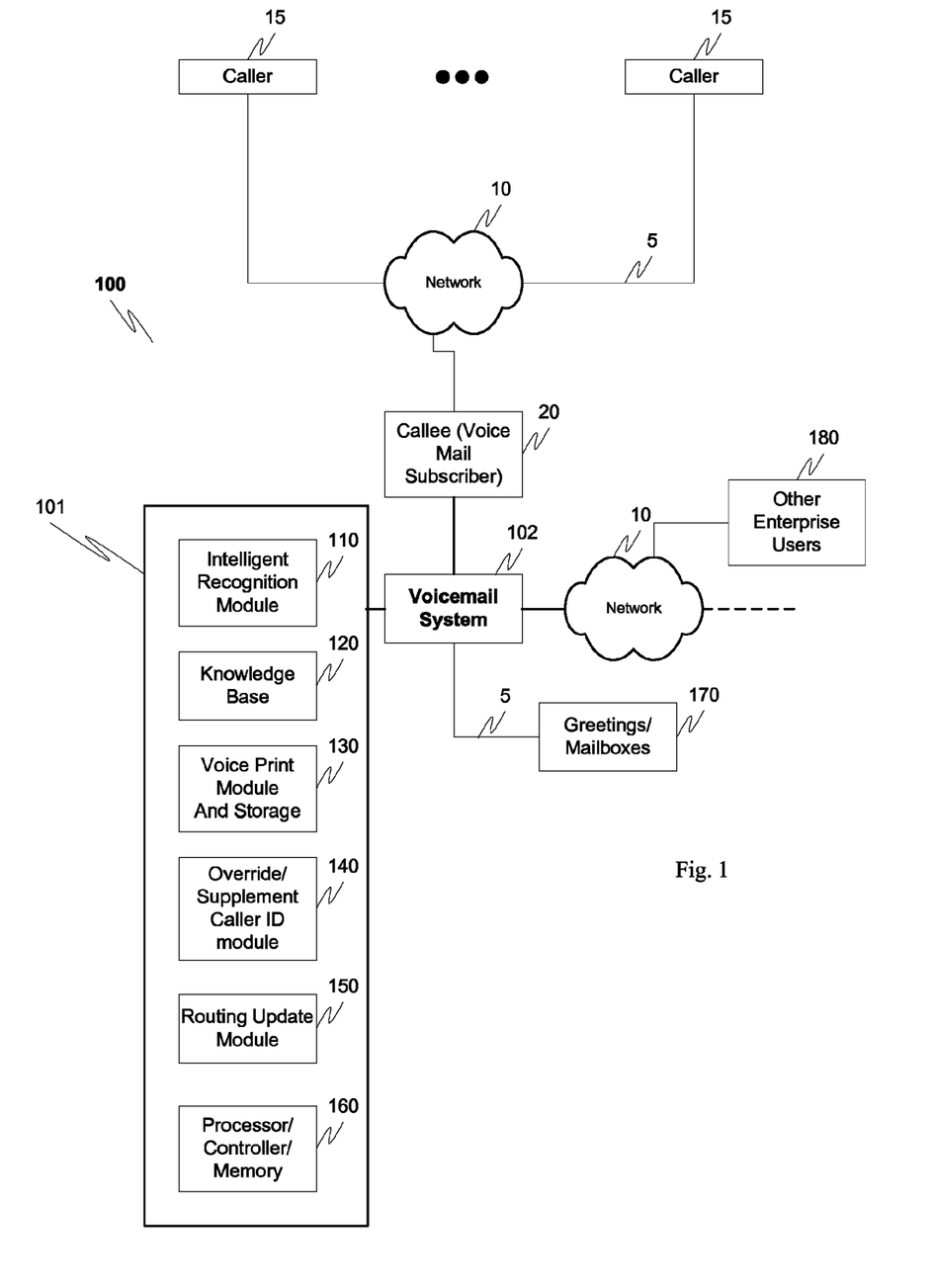
FIG. 1 illustrates an exemplary communications system according to this invention.

FIG. 1 illustrates an exemplary communications environment 100 according to this invention. In addition to well known componentry, the communications environment 100 includes one or more callers 15, one or more callees 20, voicemail system 102, caller determination module 101, mailboxes 170 and other enterprise users 180, all interconnected via networks 10 and links 5. The caller determination module 101 includes an intelligent recognition module 110, knowledge base 120, voiceprint module and storage 130, override/supplement caller ID module 140, routing update module 150, and a processor, controller and memory 160.

In operation, and as is customary for most voicemail systems, the voicemail subscriber logs into the voicemail system 102, establishes his/her greeting and sets mailbox preferences which are stored in mailboxes 170. Upon completion of the voicemail subscriber setting up the mailbox, the voiceprint module 130 accesses the voicemail subscriber's greeting(s), creates a voiceprint based on the subscribers greeting and stores the computer voiceprint information. One option for helping the caller determination module 101 in tracking the most up to date greetings would be for the voicemail system 102 to send to the voiceprint module 130 an indicator each time a voicemail subscriber updates or changes the greeting. Voiceprint module 130 could use this as a trigger to create a new voiceprint for that subscriber which will be used to assist with determining a true identity of a caller as discussed hereinafter.

Thus, in an enterprise-type voice messaging environment, voiceprints would be saved for the enterprise users and stored in the voiceprint module and storage 130.

When a caller 15 calls a colleague, such as voicemail subscriber 20, and the callee 20 fails to answer the phone, the voicemail system 102 picks up the call and allows the caller 15 to record a message, which is then stored in mailbox 170. With the caller determination module 101 capable of operation in either real-time or after receipt of a voicemail, the intelligent recognition module 110, cooperating with knowledge base 120, attempts to determine the identity of the caller. As will be discussed in greater detail, knowledge base 120 can assist with prioritizing which voiceprints should be compared to the voice message left by the caller to assist with reducing computational burden. For example, a voiceprint analysis could be started by first comparing the voiceprint of the voicemail message against the voiceprint of the caller associated with the caller ID information sent by the network. If a match is not found, the comparison could be extended to other voiceprints in the system, such as next looking at voiceprints of callers who are also in the callee's address book, and the like. The intelligent recognition module 110 could be designed to look at several factors, such as time and day, organization chart associated with the caller or callee, recent messages that were analyzed and identified on behalf of the callee, or in general any prioritization assigned to assist with creating a more optimum strategy for determining an identity of a caller. As the intelligent recognition module 110 parses and compares a left voicemail message to voiceprints stored in the voiceprint module and storage 130, the comparison continues till either a match is found or there are no internally correlated voiceprints that are determined to match the voice in the left voicemail message with a predetermined degree of confidence.

For example, it is possible that the quality of the voice message left by the caller may be degraded, may include noise, may be from an external phone that does not have similar tonal characteristics or quality of the caller's enterprise phone, or the like. In cases like this, the intelligent recognition module 110 may not be able to make a clear identity determination of the left voicemail message. Thus, the intelligent recognition module 110, cooperating with the knowledge base 120, can be assigned a confidence threshold level which will be used as the basis to determine whether a particular voiceprint match can be considered accurate. If an analysis comes below a threshold assigned to a subscriber, the match can be identified as inaccurate, and the comparison may be allowed to continue against other voiceprints in the system. The intelligent recognition module 110 can be pre-provisioned with a default threshold level, with this level capable of being adjusted by a subscriber via an appropriate interface. For example, if a callee sees several incorrect identifications of an identity of a caller who left a message as a result of inaccurate performance by the intelligent recognition module 110, the subscriber may choose to increase the threshold to reduce the likelihood of incorrect matches.

If the intelligent recognition module 110 finds a voiceprint match that corresponds to the caller ID information received from the network, intelligent recognition module 110, cooperating with the override caller ID module 140 can supply an indicator to the callee that, for example, indicates that the identity of the caller 15 has been confirmed by, for example, placing a "checkmark" in the caller ID display of the callee next to the network supplied caller ID information. This "checkmark" (or in general any indicator—visual or graphical) could symbolize that the caller 15 has been verified as the same individual associated with the number from which the call is received.

However, when the intelligent recognition module 110 finds a voiceprint match that is different from the network-supplied caller ID information, the override caller ID module 140 can override or supplement the network-supplied caller ID information with the matched caller ID information, which can be supplied to the callee upon retrieval of the caller's voicemail message. For example, when the override caller ID module determines that the identity of the caller is subscriber A, who called from extension X, this information can be displayed at the callee's phone. The characteristics of this overriding or supplemental caller ID information can be changed to assist the callee with identifying whether or not caller ID information (either played or displayed to the callee) is network-based, or based on information determined by the caller determination module 101. For example, a different font, or text attribute can be used for the overriding or supplemental caller ID information in a graphical type caller ID display, or a different voice used if the callee 20 is accessing that message from a TUI.

Based on the determined identity of the caller 15 by the caller determination module 101, various tasks, priorities, and call handling can be adjusted based on the information provided by the override caller ID module 140. For example, call routing can be updated with the cooperation of the routing update module 150. For example, if the callee 20 wishes to return the caller's 15 message, the voicemail system 102, cooperating with the override caller ID module 140, and routing module 150, could automatically dial the extension associated with the caller 15 that the caller determination module 101 determined to have actually left the message. This information could override any existing caller ID information provided by the network 10. Thus, for example, if subscriber A called from a conference room and left a voicemail for the callee 20, the voicemail system 102 would normally supply the extension associated with the conference room upon retrieval of the voicemail message left by the caller. However, since the caller was known by the caller determination module 101, and had a corresponding voiceprint, the system was able to determine that there was a match between the voiceprint of the caller 15 and a voiceprint in the system, hence determining the true identity of the caller. Therefore, when the callee 20 accessed the voicemail system and requested to respond to the caller's message, the voicemail system could automatically dial the extension number of the actual caller on behalf of the callee 20.

An extension of this modified functionality could be the modification of a prioritization assigned to a left voicemail message. For example, if the network-provided caller ID information indicates the caller was from an external extension, however the intelligent recognition module 110 determines that the identity of the caller is actually the callee's supervisor, the voicemail system 102 can re-prioritize the supervisors voicemail based on the overriding caller ID information provided by the override caller ID module 140.

Figure 2:
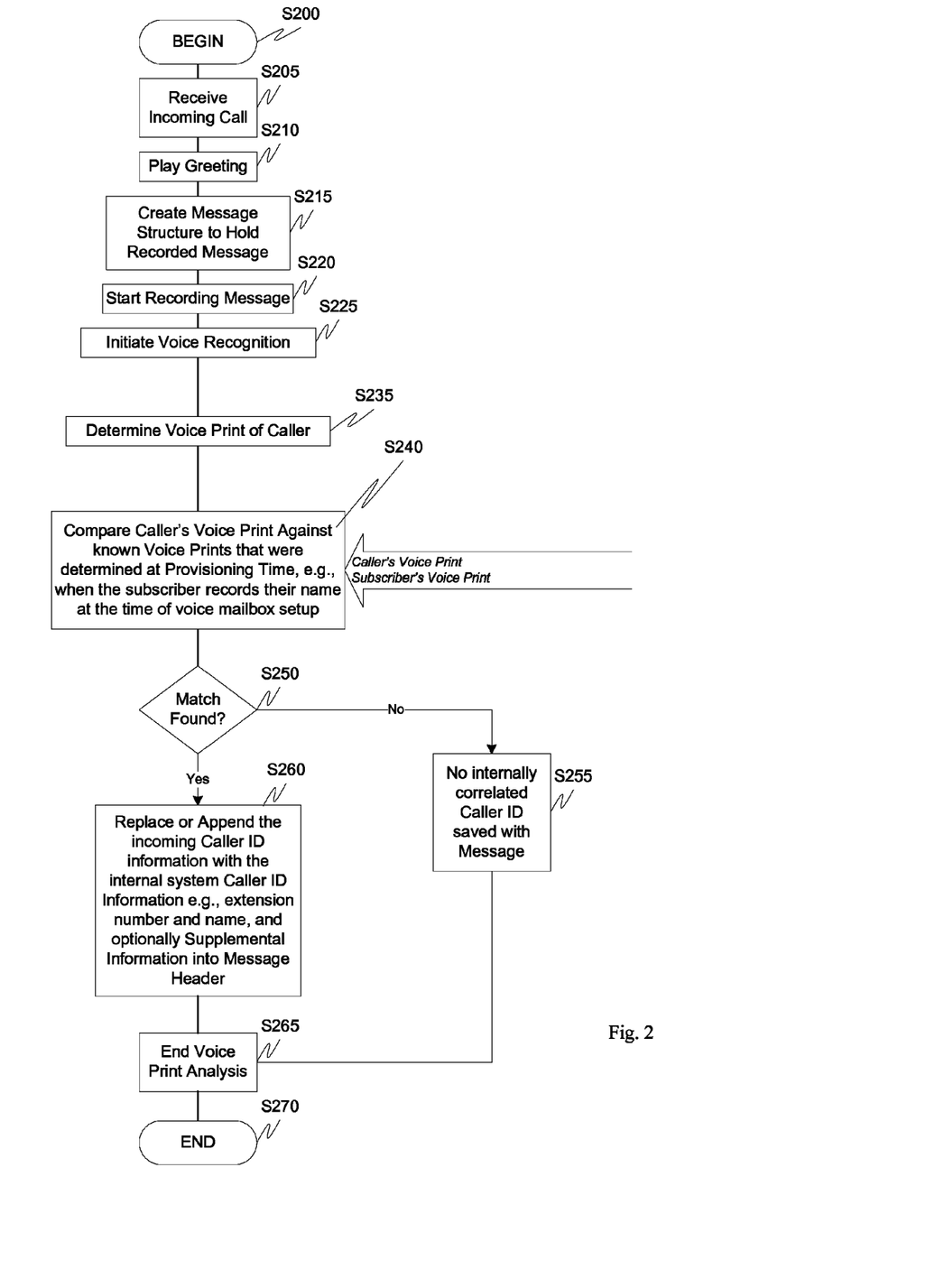
FIG. 2 illustrates a flowchart showing an exemplary methodology for determining caller identity according to this invention.

FIG. 2 outlines an exemplary methodology for assisting with determining a true identity of a caller according to an exemplary embodiment of this invention. In particular, control begins in step S200 and continues to step S205. In step S205, an incoming call is received. Next, in step S210, the callee's voicemail greeting is played. Then, in step S215, a message structure is created to hold a recorded message. Control then continues to step S220.

In step S220, recording of the caller's message commences. Next, in step S225, voice recognition is initiated. It should be noted that the voice messaging system may initiate voice recognition while the message is being recorded, or may choose to defer caller identification until after the message recording is compete. The decision for performing voice recognition while the message is being recorded versus after it is recorded may be based on different factors, such as the processing load on the voice messaging system. Control then continues to step S235.

In step S235, a voiceprint of the caller is determined. Next, in step S240, this determined voiceprint is compared against known voiceprints that were determined at provisioning time. For example, and as discussed, when a subscriber records their name and greeting at the time of voicemail box setup, these voiceprints can be used to compare the determined voiceprint to known voiceprints.

In step S250, a determination is made if a match has been found. If a match has been found, control jumps to step S260, otherwise control continues with step S255.

In step S255, and since no match is found, the network-supplied caller ID information is not modified or updated. However, as previously discussed, an indicator can be provided to the caller if no match was found.

In step S260, the network-provided caller ID can be replaced or appended with the caller ID information determined based on the comparison of the voiceprints. For example, and based on the comparison, one or more of the identity of caller, extension number and name of the caller, and supplemental information such as an indicator that a positive match was found between the caller and a voiceprint in the system can be provided to the caller. Next, in step S265, the voice analysis ends with control continuing to step S270 where the control sequence ends.

Figure 3:
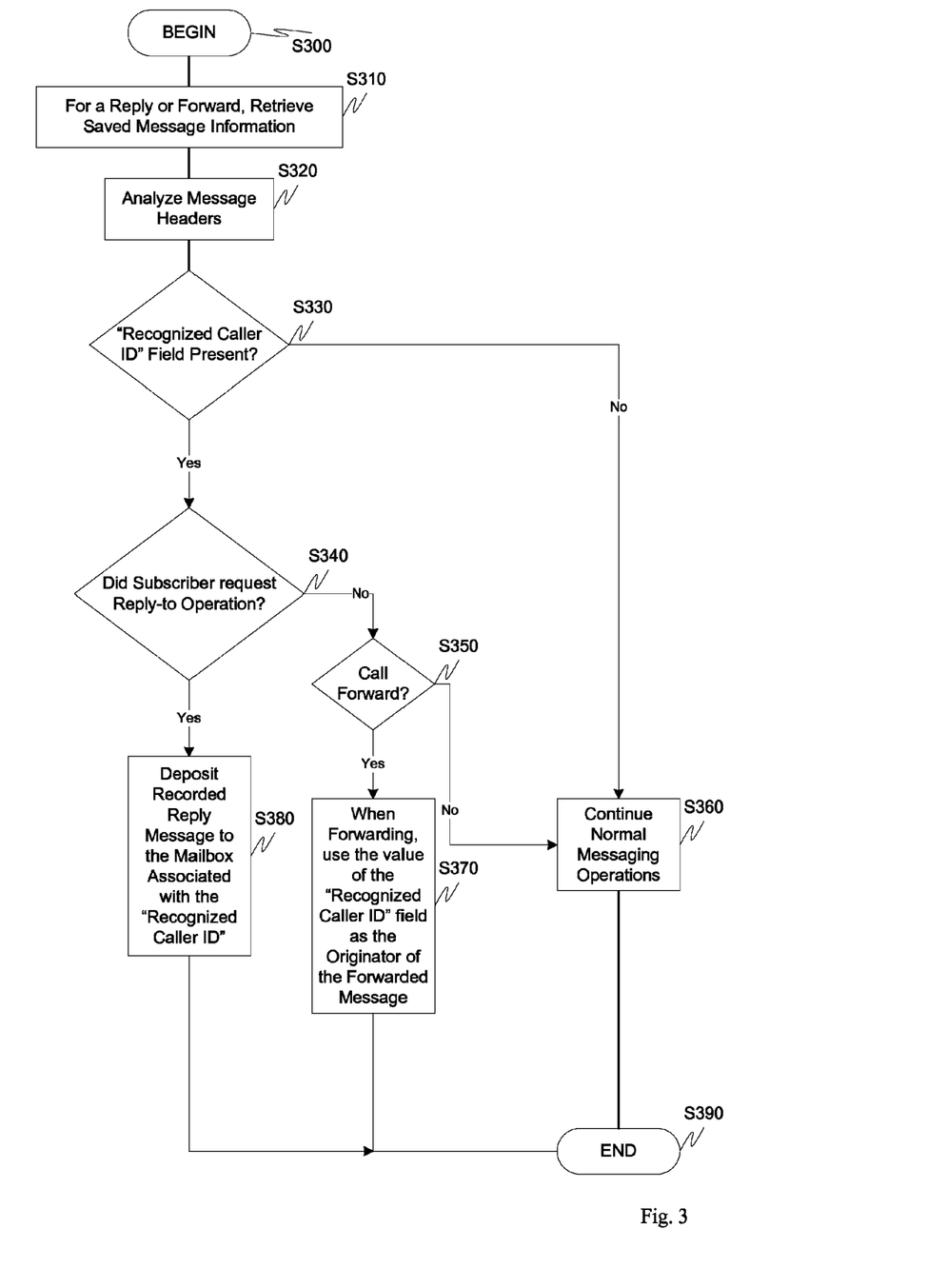
FIG. 3 illustrates an exemplary method of utilizing derived caller ID information according to this invention.

FIG. 3 outlines an exemplary methodology for modified telephony functionality according to this invention. In particular, control begins in step S300 and continues to step S310. In step S310, for a reply or forward, the system-determined caller ID information is retrieved from the saved message information. Next, in step S320, the message headers are analyzed to determine whether there was a successful correlation between the voiceprint of the caller and known voiceprints in the system. If there was a successful correlation, control jumps to step S360, with control otherwise continuing to step S340.

In step S360, and in the event there was no correlation made, normal processing operations continue with control continuing to step S390 where the control sequence ends.

In step S340, a determination is made whether the subscriber has requested a "reply-to" type operation. If the subscriber does request a "reply-to" type operation, control continues to step S380 with control otherwise jumping to step S350.

In step S350, a determination is made whether the subscriber has requested a forwarding operation. If a forwarding operation has not been requested, control jumps to step S360 with control otherwise continuing to step S370.

In step S370, and when the subscriber forwards the voicemail message, the value of the recognized caller ID field is used as the originator of the forwarded message. Control then continues to step S390 where the control sequence ends.

In step S380, and upon selection of a reply-to type operation, the recorded reply from the caller is deposited to the mailbox associated with the recognized caller ID information. Control then continues to step S390 where the control sequence ends.

A number of variations and modifications of the invention can be used. It would be possible to provide or claims for some features of the invention without providing or claiming others.

The exemplary systems and methods of this invention have been described in relation to enhancing communications, and in particular caller ID information. However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated; certain components of the system can be located remotely, at distant portions of a distributed network, such as a LAN, cable network, and/or the Internet, or within a dedicated system. Thus, it should be appreciated, that the components of the system can be combined in to one or more devices, such as a gateway, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, enterprise system, in one or more communications devices, at one or more users' premises, or some combination thereof. Similarly, one or more functional portions of the system could be distributed between a communications device(s) and an associated computing device.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASICS or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention.

Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method for enhanced voice mail comprising:
   compiling identification prints of voice mail subscribers, the compiled identification prints being stored in a voice mail system or in an external storage area associated with a voice mail system, wherein the compiled identification prints of the voice mail subscribers are determined at a provisioning time for the voice mail subscriber to the voice mail system;
   comparing a received voice mail message from one of the voice mail subscribers to one or more of the compiled identification prints;
   determining whether network-supplied caller identification information for the received voice mail message should be modified based on the comparison; and
   replacing, in a recognized caller identification field, the network-supplied caller identification information for the received voice mail with information associated with one of the compiled identification prints, wherein a Reply-to operation or a forward operation, by a voice mail recipient, for the received voice mail uses information in the recognized caller identification field for the Reply-to address or as the originator of the forwarded message, respectively.

2. The method of claim 1, further comprising providing an indicator as to whether an identity of a calling party has been determined based on the comparison.

3. The method of claim 1, further comprising providing an identity of a calling party based on the comparison.

4. The method of claim 3, wherein the identity is one or more of an extension, phone number, name and company name.

5. The method of claim 1, further comprising modifying one or more of forward-to and reply-to functionality based on the comparing step.

6. The method of claim 5, wherein the modified functionality includes usage of contact information associated with an identity of a calling party.

7. The method of claim 1, further comprising associating a threshold with the comparing step.

8. The method of claim 1, further comprising assigning a priority as to how the comparison step performs the comparison.

9. The method of claim 1, wherein the provisioning time is when a subscriber records their name and greeting at the time of voice mail box setup.

10. A non-transitory computer-readable information storage media comprising information, that when executed by a processor, performs the steps of claim 1.

11. An enhanced voice mail system comprising:
    one or more compiled identification prints of voice mail subscribers, the compiled identification prints of the voice mail subscribers being stored in the voice mail system and the identification prints representing a voice mail subscriber, wherein the compiled identification prints of the voice mail subscribers are determined at a provisioning time for the voice mail subscriber to the voice mail system; and an intelligent recognition module that compares a received voice mail message from one of the voice mail subscribers to one or more of the compiled identification prints and determines whether network supplied caller identification information for the received voice mail message should be modified based on the result of the comparison and replacing, in a recognized caller identification field which is distinct from the network supplied caller identification information, the network-supplied caller identification information for the received voice mail with information associated with one of the compiled identification prints, wherein a Reply-to operation or a forward operation, by a voice mail recipient, for the received voice mail uses information in the recognized caller identification field for the Reply-to address or as the originator of the forwarded message, respectively.

12. The system of claim 11, further comprising providing an indicator as to whether a true identity of a calling party has been determined based on the comparison.

13. The system of claim 11, further comprising an override caller ID module that provides an identity of a calling party based on the comparison.

14. The system of claim 13, wherein the identity is one or more of an extension, phone number, name and company name.

15. The system of claim 11, further comprising a routing update module that modifies one or more of forward-to and reply-to functionality based on the comparing step.

16. The system of claim 15, wherein the modified functionality includes usage of contact information associated with an identity of a calling party.

17. The system of claim 11, further comprising a processor that is associating a threshold with operation of the intelligent recognition module.

18. The system of claim 11, wherein a priority of the voice message is assigned by the voice mail system based on the results of the comparison.

19. The system of claim 18, wherein the priority is based on one or more of an identification print associated with a network supplied caller ID, a determined true ID of a caller, subscribers in an address book, frequent callers, recent callers, important callers, one or more supervisors and a peer group.

20. The system of claim 11, wherein the one or more identification prints are updated after the voice mail subscriber updates or changes their greeting.

* * * * *